Dec. 17, 1935.　　　　K. ZWICK　　　　2,024,196
CUTTER BEARING
Filed Jan. 9, 1933　　　　2 Sheets-Sheet 1
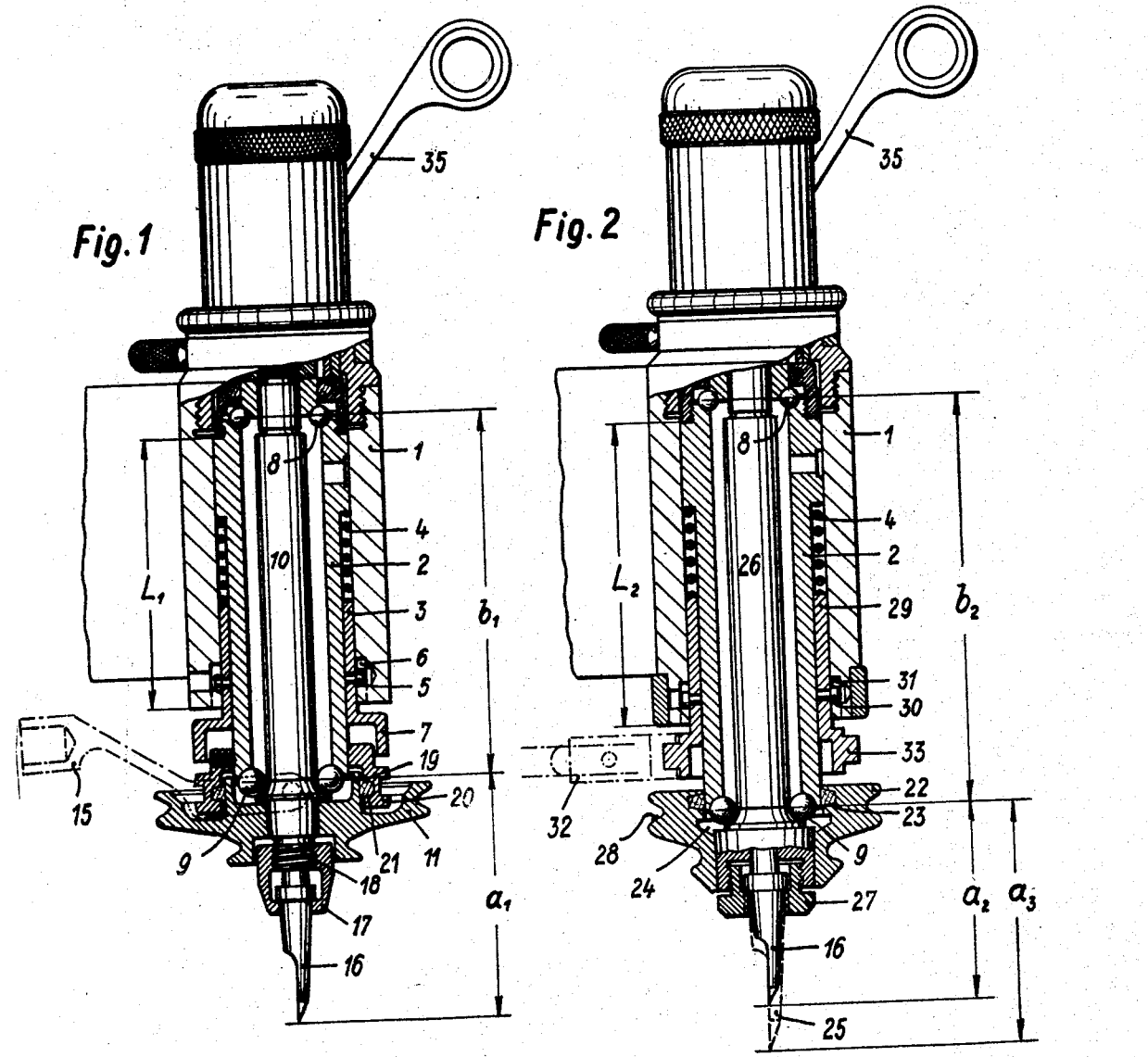
Inventor
Kurt Zwick
By Edward H. Cumpston
his Attorney Dec. 17, 1935.                    K. ZWICK                    2,024,196
                               CUTTER BEARING
                            Filed Jan. 9, 1933                2 Sheets-Sheet 2

Inventor
Kurt Zwick
By Edward H. Cumpston
his Attorney

Patented Dec. 17, 1935

2,024,196

UNITED STATES PATENT OFFICE 2,024,196

CUTTER BEARING

Kurt Zwick, Munich, Germany, assignor to Friedrich Deckel, Munich-Prinz Ludwigshohe, Germany Application January 9, 1933, Serial No. 650,865
In Germany January 18, 1932

17 Claims. (Cl. 90—62)

This invention relates to cutter bearings for the cutting spindles or arbors of engraving and copying machines and the like. An object of the invention is to provide such a cutter bearing of a generally improved and more satisfactory construction.

Another object of the invention is the provision of such a cutter bearing so designed that one of the points of support of the spindle may be closer to the end of the cutter or tool than heretofore, thus resulting in a construction stronger and more rigid than those heretofore employed, and in which the proportions of the lever arms are more satisfactory.

Still another object is the provision of a bearing so designed that the lubrication of the parts is improved, and of an improved construction of packing for retaining the lubricant in place.

A further object is the provision of a bearing so designed that the stress tending to bend the spindle caused by the driving belt or cord is eliminated or substantially reduced.

A further object is the provision of a bearing designed to provide, in construction of a given size, a greater length of contact between certain sliding parts than has heretofore been possible.

A still further object is the provision of a construction which may be used with either large or small cutting tools as desired, and preferably one which is adapted to receive either cylindrical or tapered cutters at will, and to receive double ended cutters if desired.

A still further object is the provision of a cutter bearing of simple and sturdy construction which may be manufactured easily and at a reduced cost compared to similar bearings heretofore known.

To these and other ends the invention resides in certain improvements and combinations of parts, all as will be hereinafter more fully described, the novel features being pointed out in the claims at the end of the specification.

In the drawings:

Fig. 1 is a diagrammatic view, partly in elevation and partly in vertical section, of a cutter bearing of the character described, illustrating one possible embodiment of the invention;

Fig. 2 is a similar view showing a second embodiment of the invention;

The same reference numerals throughout the several views indicate the same parts.

Figure 3:
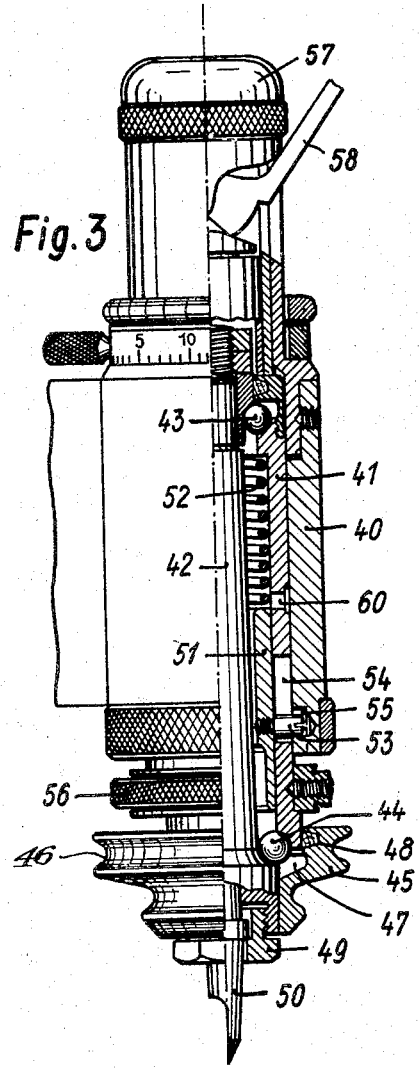
Fig. 3 is a similar view showing a third embodiment of the invention.

The present invention deals with the bearing and associated parts of a spindle or arbor for use in engraving or copying machines. The drawings and detailed description are confined to the parts immediately concerned with the invention, since engraving and copying machines are already well known. One possible form of such a machine is shown, for example, in United States Patent No. 1,617,312, granted February 8, 1927, for an invention of Lorenz Konrad Braren.

In such machines, the spindles commonly run in a vertical position, and are so shown in the present drawings. Referring now to Fig. 1 of the drawings, there is illustrated a tool holder or supporting body 1 which might, for example, be part of or attached to a pantograph system of a copying and engraving machine. In a suitable cavity in the supporting member 1 is a tubular body or bearing sleeve 2 of reduced outside diameter in its lower portion, and a retaining member or sleeve 3 encircles the reduced portion of the bearing member 2 and fits between it and the member 1, all as plainly shown in Fig. 1. A coiled spring 4 presses downwardly on the top of the retaining sleeve 3 and upwardly on a shoulder of the bearing member 2, as shown in the drawings, and thus tends to hold the bearing member 2 in its uppermost position. The retaining sleeve 3 is normally held against downward movement by means of projections or pins 5 on the retaining sleeve which engage with slots or recesses 6 in the body 1 in the manner of a bayonet joint.

To remove the bearing from the holder 1, a conveniently accessible flange 7 on the retaining sleeve 3 may be grasped to turn the sleeve 3 slightly to disengage the pins 5 from the bayonet slots 6, and when the pins are disengaged, the retaining sleeve together with the entire bearing member 2 may be withdrawn from the body 1, and the parts may be replaced by a reverse operation.

The spindle 10 is mounted for rotation within the bearing member 2 and is supported from the bearing member by suitable bearings such as an upper ball bearing 8 and a lower ball bearing 9. Below the lower bearing 9 the spindle is provided with an enlargement which may be formed integrally with the spindle, but which preferably is a separate piece placed on and securely fastened to the spindle, as shown, and is developed into the driving pulley 11 having a groove for receiving a belt or cord for transmitting motion to the spindle.

The lower end of the spindle has a bore, preferably conical, for receiving the cutting tool 16 having a shank which may be of correspondingly conical form at its upper end, as is well known in the engraving machine art. The cutter 16 may be held in place by a cap nut 17 seated on screw threads 18 formed exteriorly on the lower end of the spindle 10.

As one of the important features of the present invention, the enlargement 11 on the lower end of the spindle is shaped to provide an upstanding annular flange or rim 19 of larger diameter than the lower spindle bearing 9, so that it may extend upwardly to or beyond the plane of the bearing 9 around the outside of the bearing without interfering with the bearing. Thus there is provided within the flange 19 a space or chamber which may be filled or partly filled with oil or other suitable lubricant for the lower bearing 9. Also, the exterior surface of the flange 19 may be advantageously employed for packing the bearing to retain the lubricant therein. To this end, a flange 20 may be secured to and depend from the lower end of the bearing body 2, outside of the flange 19 on the enlargement 11, and may be provided with packing rings 21 of felt or other suitable packing material, contacting with the exterior surface of the flange 19.

It will be seen that by the use of packing surfaces of larger diameter than the diameter of the lower bearing 9, the bearing may be dropped downwardly to a point substantially in the plane of the packing surfaces and thus may be brought closer to the end of the tool 16 than in prior bearings of somewhat similar construction, in which the lower spindle bearing was above the packing and consequently farther away from the cutting tool. Furthermore, the placing of the packing substantially at or above the plane of the bearing makes the packing more effective in retaining the lubricant than when it is materially below the bearing. And in the present embodiment, the rim 19 overlapping the flange 20 and the lower end of the member 2, forms what might be termed a labyrinth construction making the escape of lubricant still more difficult.

The distance of the bearing from the end of the cutting tool (represented by the line $a_1$) is of considerable importance in machines of this kind, as is the ratio of this distance to the distance between the upper and lower spindle bearings (represented by the line $b_1$ in the drawings). The cutting tool, in an engraving or copying machine, is frequently subjected to severe side strains, and it is obvious that the closer the bearing is to the cutting end of the tool, the less will be the tendency to bend or distort the spindle or the tool. The less the ratio of the lever arm $a_1$ to the lever arm $b_1$, the less stress there will be on the upper bearing and the more firmly and accurately the parts will be held.

It is interesting to note that in a certain bearing construction heretofore commonly used and quite similar in some respects to the bearing illustrated in Fig. 1, but not having the improvements of the present invention, the lever arm $a$ is 53.3 millimeters in length, while the lever arm $b$ is 63.5 millimeters in length, the ratio $a/b$ thus being in the proportion 84/100. In the improved bearing of the present invention shown in Fig. 1, however, with exactly the same over all dimensions as in the prior bearing construction above mentioned, the lever arm $a_1$ has been reduced to 46.8 millimeters, while the lever arm $b_1$ has been increased to 70 millimeters, making a ratio for these arms of 67/100, materially superior to the prior ratio of 84/100.

It is also to be noted that the length of the contact or bearing surface of the parts 2 and 3 against the part 1 (represented by the line $L_1$ in Fig. 1) is also increased over the corresponding length in prior bearings. This results from the fact that it is possible to drop the lower bearing 9 down closer to the lower end of the spindle, which in turn permits the lower end of the retaining sleeve to be brought down farther, so that the tool holding body 1 can be extended farther down than has heretofore been considered possible. The length of this contacting surface is important because, as understood by those skilled in the art, it is frequently desired in use to move the spindle 10 and member 2 bodily upwardly or downwardly with relation to the holder 1, such movement being accomplished by known mechanism controlled by the lever 35. During such movements, the member 2 slides along the interior surfaces of the members 1 and 3, and the longer the contacting surfaces can be made, the greater the accuracy with which the parts are guided.

Another feature of importance in cutter bearings of this kind is the distance of the driving pulley from the spindle bearing. Heretofore, it has usually been necessary to place the driving pulley some distance away from the spindle bearing, with the result that the traction of the belt or cord has tended to cause deflection in the spindle. In the improved construction shown in Fig. 1, however, it is seen that the belt or cord groove in the pulley 11 is extremely close to the plane of the spindle bearing 9, so that the traction of the belt produces little or no tendency to distort the spindle.

A belt guiding attachment of known construction, indicated diagrammatically at 15, can be attached to and supported by the packing flange 20, thus bringing the attachment relatively close to the plane of the driving pulley 11.

In Fig. 2 there is illustrated still another possible embodiment of the invention having certain advantages over that shown in Fig. 1. In Fig. 2, the tool holder 1, bearing body 2, and spring 4 may be of a construction similar to that described in connection with Fig. 1. Because of the improvements illustrated in Fig. 2, however, the lower bearing 9 can be dropped down still farther than the bearing in Fig. 1, and consequently the bearing member 2 can be made longer than the bearing member in Fig. 1, so that the bottom edge of the holder body 1 can also be extended downwardly, resulting in a longer length $L_2$ of engagement of the movable parts with the tool holder.

According to this embodiment of the invention, the enlargement 22 is shaped somewhat differently than the enlargement 11 in Fig. 1, being formed as shown clearly in the drawings so that it extends upwardly around the lower end of the bearing member 2 to a point above the plane of the lower bearing 9. The packing may be provided in this instance, by suitable packing rings 23 of felt or the like mounted on the enlargement 22 and engaging the exterior surface of the bearing member 2, preferably in a plane at or slightly above the plane of the lower bearing 9. Hence any lubricant tending to escape from the bearing would have to pass upwardly through the packing, so that not only the packing material itself but also the force of gravity would tend to retain the lubricant in place.

The enlargement 22 is preferably shaped to provide also a chamber or cavity 24 forming a lubricant reservoir. If fluid oil is used for the lower bearing, the oil level preferably is not above the middle of the lower bearing 9, and above this lower bearing the space around the spindle 26 is usually packed with grease. The constructions illustrated in the other figures of the drawings are preferably lubricated in the same way.

The outer surface of the enlargement 22 may be formed wtih a groove 28 for the driving belt or cord, so that the enlargement 22, as before, constitutes the driving pulley as well as being used to provide one of the two cooperating packing surfaces for the bearing. By this construction, the further advantage is produced that the belt groove may be placed in the plane of the lower bearing 9, as clearly illustrated in Fig. 2, so that the belt traction has no tendency whatever to distort the spindle.

This improved construction allows the lower bearing 9 to be dropped down still farther than shown in Fig. 1, with a consequent lessening of the lever arm $a_2$ and an increase of the lever arm $b_2$. For example, an embodiment constructed as in Fig. 2 may be made with a lever arm $a_2$ of 38.2 millimeters, while $b_2$ is 78 millimeters, resulting in a ratio equivalent to 49/100. This is a very material and advantageous reduction of the ratio 84/100 previously mentioned as being the ratio of a comparable prior art bearing, and is somewhat better than the ratio of 67/100 obtained in the embodiment illustrated in Fig. 1.

Furthermore, the lower bearing 9 in Fig. 2 is dropped so far down that cutters of extremely large size may be employed without making the lower lever arm disadvantageously long. For example, if in place of the regular cutter 16 there be used an extra long cutter 25, as illustrated in dotted lines, then the corresponding cutter arm $a_3$ is still only 47.5 millimeters, resulting in a ratio between the lever arms of 61/100, still much better than the prior art construction and even better than the embodiment shown in Fig. 1.

Another of the advantageous features of this construction is that the lower end of the spindle, below the bearing 9, is made of enlarged diameter in comparison to the diameter previously employed at this point, and preferably is of a larger diameter than that of the bearing 9, as shown in the drawings. This increase in diameter enables the lower end of the spindle to be provided with a female or internal thread which may be engaged by a male nut 27 for holding the cutter in place. Thus the collar or shoulder on the cutter, as plainly shown in the drawings, may be brought to a point actually within the end of the spindle as illustrated, instead of being outside of the end of the spindle as it is in Fig. 1 and in the prior art constructions. This results in a stronger and more rigid construction.

The retaining sleeve 29 in the present embodiment, corresponding to the retaining sleeve 3 of the embodiment shown in Fig. 1, may be provided with pins 30 engaging bayonet slots 31 in the body 1, and may have a rim 33 serving not only to grasp the retaining sleeve for insertion and withdrawal, but also as a support for the belt guiding attachment 32.

The construction shown in Fig. 3 of the drawings is similar in many respects to that illustrated in Fig. 2, but has some important differences. In Fig. 3, the body of the tool holder or support is indicated at 40, the removable bearing member is shown at 41, and the spindle 42 is supported from the bearing member by an upper bearing 43 and a lower bearing 44. This lower bearing 44 is dropped downwardly quite close to the end of the spindle, to a point within the enlargement 45, which enlargement is provided with a tool or cord groove 46 preferably in the plane of the bearing 44, and with a lubricate cavity or recess 47, all as in the case of the construction illustrated in Fig. 2. The packing, like that of Fig. 2, may be provided by packing rings 48 of felt or other suitable material on the enlargement 45 encircling and engaging the outside surface of the bearing member 41 in a plane at or above the lower bearing 44.

The lower end of the spindle 42, like that of the spindle 26 in Fig. 2, is preferably enlarged as shown, and provided with female threads for engaging a male retaining nut 49 for holding the cutter 50 in place.

The important difference between this construction and that shown in Fig. 2, is that the retaining sleeve 51 in the present instance is placed inside the bearing member 41 instead of outside. A coiled spring 52 presses downwardly on the retaining sleeve 51 and upwardly on a shoulder formed on the inside of the bearing member 41. Pins 53 mounted on the retaining sleeve 51 extend outwardly through slots 54 formed in the bearing member 41 and engage in bayonet slots 55 in the body 40.

Around the lower end of the bearing member 41 is a knurled ring 56 which may be conveniently grasped for inserting or removing the bearing in the tool holder 40. At the top of the tool holder is the usual pressure plate or limiting device indicated diagrammatically at 57, for limiting the extent to which the bearing member 41 can move upwardly, and the usual adjusting device of known construction operated by the lever 58, for moving the bearing member downwardly when desired.

When the bearing is removed from the holder, the spring 52 keeps the retaining sleeve 51 pressed downwardly so that the pins 53 are engaged with the bottom ends of the slots 54. To insert the bearing in the tool holder, it is grasped by the ring 56 and inserted upwardly into the cavity in the holder 40 to a position slightly higher than normal, the pins 53 meanwhile entering the vertical parts of the bayonet slots 55, and then the device is given a slight rotation to move the pins laterally into the horizontal parts of the bayonet slots. The bearing body 41 is then moved slightly downwardly to its normal position and held in this position by suitable adjustment of the pressure plate 57, which movement has the effect of shifting the bottom ends of the slots 54 away from the pins 53 and causing these pins to rest firmly in and be supported by the bayonet slots 55.

This construction, in which the retaining sleeve is placed inside of the bearing member instead of in the previous conventional outside position, is of considerable importance. In the first place, the retaining sleeve in this new construction acts only as a retaining sleeve and does not in any way guide or support the bearing member 41 during any upward and downward sliding movements which may take place in use. Consequently, the retaining sleeve may be made of less high grade material, and less accurately machined, than when it acts also to support the bearing member. Furthermore, in this new construction, the outside surface of the bearing member 41, or at least that portion of the surface which makes sliding contact with the holder 40 during operation, is all of a single uniform diameter so that it may be machined and finished readily in a single operation, thus reducing the expense. In comparison to this, in the previous construction in which the retaining sleeve was outside of the bearing member, as shown for example in Fig. 2, a part of the outside surface of the bearing member was of one diameter, sliding directly on the holder, and another part of the surface was of a smaller diameter, sliding on and laterally supported by the retaining sleeve. Thus, in the prior construction, additional operations were necessary in machining the bearing member, since both the surfaces of different diameter had to be accurately machined and finished.

Another advantage of the improved construction illustrated in Fig. 3 is that the retaining sleeve may be used as a lubricant pump. It will be readily understood by those skilled in the art that the interior of the bearing is usually filled with lubricant, which may be introduced, for example, through the opening 60. A quantity of oil usually is provided for the lower bearing 44, and the rest of the interior space is filled or partially filled with grease or the like. According to the present invention, the retaining sleeve 51, now placed on the interior of the bearing member 41, is made relatively thick at least in its upper part so that it has a considerable displacement. Hence, whenever the sleeve 51 and member 41 move longitudinally relatively to each other, the sleeve acts as a pump in the space between the member 41 and the spindle 42, stirs up the lubricant, and feeds sufficient lubricant to the upper bearing 43.

Figure 4:
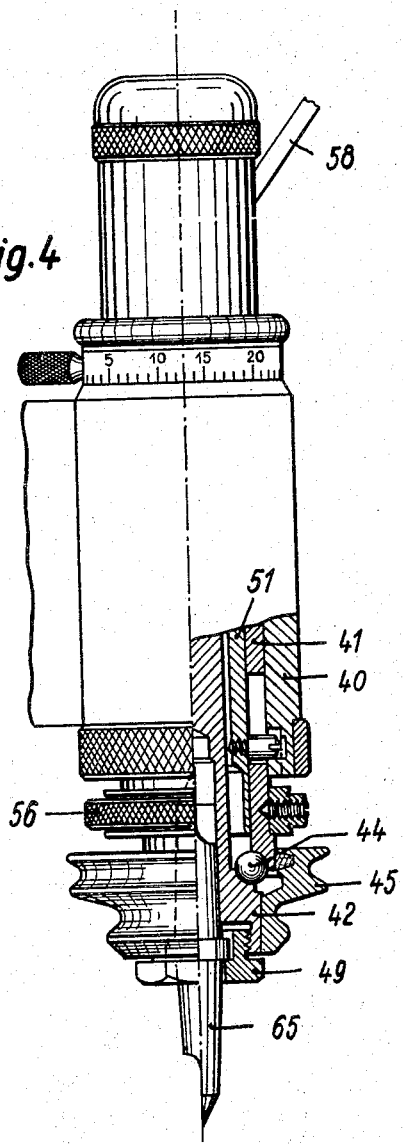
Fig. 4 is a similar view illustrating still a fourth embodiment of the invention.

Fig. 4 shows a construction similar to that of Fig. 3 except that it illustrates a larger and stronger cutter 65 in place of the cutter 50 shown in Fig. 3. Because of the improved construction shown in these figures, it is possible without detrimental effect to make the bore for receiving the cutter of sufficient size so that large cutters like the cutter 65 may be used, and also of sufficient length so that double ended cutters may be employed as shown in Fig. 4. This cutter 65 is of the double ended conical variety, as will be plainly apparent from the drawings to those skilled in the art. The bore in the spindle 42 is slightly conical or tapered to correspond to the taper of both ends of the cutter 65.

It is noted that the large cutter 65 is substantially longer than the smaller cutter 50 shown in Fig. 3. In the prior constructions, such an extra large cutter frequently could not be inserted at all in the spindle, and if it could be inserted, would frequently be unsatisfactory because there would be such a long lever arm between the end of the cutter and the lower bearing. In the present construction, however, the lower bearing 44 has been dropped down so close to the end of the spindle that even with the use of an extra large cutter, the lever arm from the end of the cutter to the plane of the bearing is still not excessive, and satisfactory results may be obtained.

Figure 5:
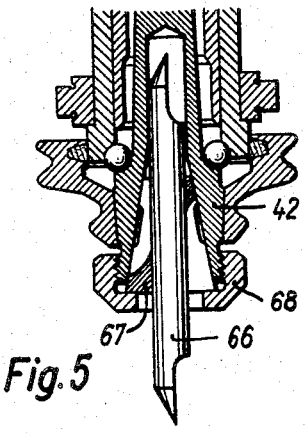
Fig. 5 is a diagrammatic vertical section through the lower end of the cutter bearing parts showing a double ended cylindrical cutter of relatively large size.

In Fig. 5 there is illustrated a powerful cylindrical cutter 66 of the double ended type, having cutting edges at both ends. According to the present invention, the lower end of the spindle 42 may have a bore of conical or tapered shape at least through part of its length as shown. A collet 67, alternately slit from both ends to allow it to be compressed throughout its entire length, may be employed for holding the cylindrical cutter in the bore, the interior surface of the collet being cylindrical and of the proper size to fit the cutter 66, and the exterior surface of the collet being tapered to fit the bore in the spindle. The collet may be held in place by a cap nut 68 threaded on the lower end of the spindle and when this nut is tightened, the entire collet is compressed due to its slit construction, tightly clamping the cutter in place.

Figure 6:
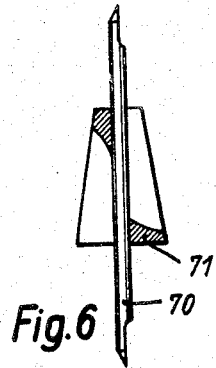
Fig. 6 is a view of a double ended cylindrical cutter of smaller size together with the collet for connecting it to the spindle.

This construction is advantageous since different sizes of cutters may be applied to the same spindle by the use of different sizes or kinds of collets. For instance, in some work, extremely thin cutters are desirable, and such a cutter is indicated at 70 in Fig. 6 of the drawings. It may be used with a collet 71 similar to the collet 67 in Fig. 5, and having the same outside diameter as the collet 67 so that it will fit into the same tapered bore of the spindle, but having an interior opening of a smaller diameter so as to fit the smaller cutter 70.

Obviously the interior surface of the collet may be made of any desired shape or form to fit the shank of any cutter. Thus a tapered cutter may be used in the same spindle which is adapted to receive the cylindrical cutter, either by making the shank of the tapered cutter of the proper size and shape to fit directly into the tapered spindle, or by using a collet having a tapered interior surface to correspond to the taper of the cutter shank if this taper is different from the taper of the bore in the spindle.

Figure 7:
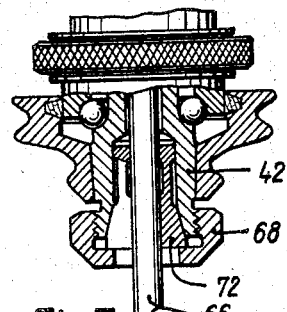
Fig. 7 is a view somewhat similar to Fig. 5 showing a slightly different form of construction.

Fig. 7 illustrates the bore in the spindle 42 of a different shape to fit a different form of collet 72 which is usual in the trade. Here, instead of having the bore tapered through the entire portion which engages the collet, the bore is tapered through only a short distance at the lower end, and above this it has a cylindrical portion, so that it may fit the usual collets which are partly tapered and partly cylindrical as plainly shown in the drawings.

From the foregoing description taken in connection with the accompanying drawings, it will be seen that various improvements and advantages are provided by the present invention. It must be realized that engraving machines, in order to be satisfactory, must be of sturdy and rigid construction since any lateral play or deflection of the spindles or cutters would cause unsatisfactory work especially when being used in engraving very fine lines. According to the present invention, the lower spindle bearing has been placed relatively close to the cutter and the proportions of the lever arms have been greatly improved without increasing the overall size or dimensions of the construction. Also better and longer bearing surfaces are provided between the removable bearing assembly and the holder, so that better lateral support is provided for the spindle.

At the same time, it has been shown that according to the present invention the cutters themselves are held in an improved and more rigid manner, and that great flexibility of operation results from the fact that cutters of a number of different styles and sizes may be used on the same spindle. Those skilled in the art will understand, of course, that the arrangements illustrated in Figs. 5, 6, and 7 can be applied to any of the embodiments shown in Figs. 1 to 4 inclusive.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An engraving or copying machine of the type including a support and a spindle rotatable within said support about a substantially vertical axis, characterized by a bearing between the spindle and the support for supporting the spindle, an oil chamber immediately below said bearing, and substantially oil-tight packing means including means forming a surface of larger diameter than said bearing associated with said support and means forming a contacting surface associated with said spindle and rotatable therewith, for preventing escape of oil from such chamber.

2. An engraving or copying machine of the type including a support and a spindle rotatable within said support about a substantially vertical axis, characterized by a bearing adjacent the lower end of said spindle for supporting the spindle from the support, an enlargement on said spindle below said bearing, said enlargement having a portion spaced from said spindle and extending upwardly to form a lubricant member, and means associated with said support engaging said portion of said enlargement to form substantially oil-tight packing between said spindle and said support.

3. An engraving or copying machine of the type including a support and a spindle rotatable within said support about a substantially vertical axis, characterized by an upper bearing and a lower bearing interposed between said spindle and said support, a lubricant chamber adjacent said lower bearing for holding lubricant in effective position with relation to said lower bearing, and substantially oil-tight packing means between said spindle and said support at a point above the bottom of said lower bearing for retaining lubricant in said chamber.

4. An engraving or copying machine of the type including a support and a spindle rotatable within said support about a substantially vertical axis, characterized by an upper bearing and a lower bearing interposed between said spindle and said support, a lubricant chamber adjacent said lower bearing for holding lubricant in effective position with relation to said lower bearing, and substantially oil-tight packing means of larger diameter than said lower bearing and located at a point above the bottom of said lower bearing for retaining lubricant in said chamber.

5. An engraving or copying machine of the type including a support and a spindle rotatable within said support about a substantially vertical axis, characterized by a bearing interposed between said spindle and said support, a driving pulley mounted on said spindle below said bearing, said pulley being shaped to provide a lubricant chamber adjacent said bearing, and packing means including a surface on said pulley of larger diameter than said bearing and a cooperating surface associated with said support for retaining lubricant in said chamber.

6. An engraving or copying machines of the type including a support and a spindle rotatable within said support about a substantially vertical axis, characterized by a bearing interposed between said spindle and said support, a driving pulley mounted on said spindle adjacent said bearing, said pulley being shaped to provide a bearing, said pulley being shaped to provide a lubricant chamber adjacent said bearing, and packing means including a surface associated with said support and a cooperating surface on said pulley surrounding said first named surface and contacting therewith to form a substantially oil-tight joint.

7. An engraving or copying machine of the type including a support and a spindle rotatable within said support about a substantially vertical axis, characterized by a bearing interposed between said spindle and said support, a driving pulley mounted on said spindle adjacent said bearing, said pulley being shaped to provide a bearing, said pulley being shaped to provide a lubricant chamber adjacent said bearing, and packing means including a rim on said pulley spaced from said spindle and having a surface, and a cooperating surface associated with said support and contacting with said surface on said rim.

8. An engraving or copying machine of the type including a supporting body and a bearing member removably mounted within said supporting body, characterized by a retaining sleeve slidable within said bearing member for retaining said bearing member within said supporting body, and a spindle rotatable within said sleeve and supported from said bearing member.

9. A cutter bearing for engraving and copying machines and the like comprising a supporting body, a bearing member within said body, a retaining sleeve within said bearing member, means for securing said sleeve to said body so that said bearing member may slide between said sleeve and said body while said sleeve remains in fixed position relative to said body, and a cutter spindle rotatable within said sleeve and supported from said bearing member.

10. A cutter bearing for engraving and copying machines and the like comprising a supporting body, a bearing member within said body, a retaining sleeve within said bearing member, means for securing said sleeve to said body so that said bearing member may slide between said sleeve and said body while said sleeve remains in fixed position relative to said body, and a cutter spindle rotatable within said sleeve and supported from said bearing member, said sleeve having a comparatively large volume of displacement relative to the volume between said bearing member and said spindle, so that said sleeve may act as a lubricant pump when said bearing member slides relatively to said sleeve.

11. An engraving or copying machine comprising a support, a spindle rotatable within said support and projecting from one end thereof, a support and projecting from one end thereof, a bearing adjacent said end of said support for supporting said spindle from said support, the end of said spindle projecting beyond said bearing having a relatively large outside diameter, a female screw in said relatively large end, and screw thread means engaging said female screw to secure a cutting member to said spindle.

12. An engraving or copying machine comprising a support, a spindle rotatable within said support and projecting from one end thereof, a bearing adjacent said end of said support for supporting said spindle from said support, the end of said spindle projecting beyond said bearing having a bore which is conical at least in part, a cutting member having a shank within said bore of smaller diameter than said bore, and a collet having an interior surface shaped to fit said shank and an exterior surface shaped to fit said bore, for holding said cutting member in proper position within said bore.

13. An engraving or copying machine comprising a support, a spindle rotatable within said support and projecting from one end thereof, a bearing adjacent said end of said support for supporting said spindle from said support, the end of said spindle projecting beyond said bearing having a relatively large outside diameter, said projecting portion of large diameter having a relatively long bore extending longitudinally in said spindle from said end to a point inwardly of said bearing and of sufficient size to receive a double ended cutting member, and means for retaining said double ended cutting member in said bore.

14. An engraving or copying machine of the type including a support, a spindle rotatable within said support about a substantially vertical axis, an upper bearing and a lower bearing spaced from each other between said spindle and said support, characterized by an enlargement on said spindle below said lower bearing, said enlargement forming a bottom of a lubricant chamber adjacent said lower bearing, and substantially oil-tight packing means above said bottom of said chamber for retaining oil in said chamber.

15. An engraving of copying machine of the type including a support, a spindle rotatable within said support about a substantially vertival axis, an upper bearing and a lower bearing spaced from each other between said spindle and said support, characterized by an enlargement on said spindle below said lower bearing, said enlargement having a portion extending outwardly and upwardly to an elevation at least as high as said lower bearing and extending around said lower bearing to form a bottom and sides of a lubricant chamber adjacent said lower bearing, and packing means associated with said upwardly extending portion of said enlargement to prevent escape of lubricant from said chamber.

16. Apparatus according to claim 14, in which said enlargement forms part of a driving pulley for driving said spindle.

17. Apparatus according to claim 14, in which said enlargement forms part of a driving pulley having a belt groove substantially in the plane of said lower bearing.

KURT ZWICK.